United States Patent
Umeyama et al.

(10) Patent No.: US 10,050,248 B2
(45) Date of Patent: Aug. 14, 2018

(54) SECONDARY BATTERY

(71) Applicant: TOYOTA JIDOSHA KABUSHIKI KAISHA, Toyota-shi, Aichi (JP)

(72) Inventors: Hiroya Umeyama, Okazaki (JP);
Harunari Shimamura, Toyonaka (JP);
Tatsuya Hashimoto, Osaka (JP);
Yusuke Fukumoto, Toyonaka (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 116 days.

(21) Appl. No.: 15/139,953

(22) Filed: Apr. 27, 2016

(65) Prior Publication Data

US 2016/0322621 A1    Nov. 3, 2016

(30) Foreign Application Priority Data

Apr. 30, 2015    (JP) .................. 2015-093030

(51) Int. Cl.
*H01M 2/16*        (2006.01)
*H01M 10/04*       (2006.01)
(Continued)

(52) U.S. Cl.
CPC ....... *H01M 2/1686* (2013.01); *H01M 2/1666* (2013.01); *H01M 2/1673* (2013.01);
(Continued)

(58) Field of Classification Search
CPC .... H01M 2/16; H01M 2/1666; H01M 2/1673; H01M 2/1686; H01M 2/14; H01M 2/145;
(Continued)

(56) References Cited

U.S. PATENT DOCUMENTS

| | | | |
|---|---|---|---|
| 2001/0014394 A1* | 8/2001 | Soane ................ | C08J 9/04 428/364 |
| 2012/0183862 A1* | 7/2012 | Gupta ................ | H01M 2/162 429/254 |
| 2015/0372273 A1 | 12/2015 | Lee | |

FOREIGN PATENT DOCUMENTS

| CN | 103180999 A | 6/2013 |
|---|---|---|
| CN | 104160527 A | 11/2014 |

(Continued)

*Primary Examiner* — Karie O'Neill Apicella
(74) *Attorney, Agent, or Firm* — Sughrue Mion, PLLC

(57) ABSTRACT

Provided is a secondary battery that exhibits excellent retention of an electrolyte solution in an electrode body and excellent high rate charging and discharging characteristics. A secondary battery provided by the present invention includes an electrode body, which has a positive electrode, a negative electrode and a separator that electrically isolates the positive electrode from the negative electrode, and an electrolyte solution. In addition, the secondary battery has a non-woven fabric layer between the separator and the positive electrode and/or between the separator and the negative electrode. At least some of the fibers that constitute the non-woven fabric layer have one non-through hole in each of the fibers, with the non-through hole having an opening in one end of the fiber in a length direction thereof and extending in the length direction of the fiber. The length ($L_W$) from the opening of the non-through hole to the deepest part of the non-through hole in the length direction is 50% or higher of the entire length ($L_F$) of the fiber.

6 Claims, 6 Drawing Sheets

(51) Int. Cl.
*H01M 2/14* (2006.01)
*H01M 10/0525* (2010.01)
*D01D 5/00* (2006.01)

(52) U.S. Cl.
CPC ........... *D01D 5/0007* (2013.01); *H01M 2/145* (2013.01); *H01M 10/0431* (2013.01); *H01M 10/0525* (2013.01)

(58) Field of Classification Search
CPC ............ H01M 10/04; H01M 10/0431; H01M 10/0525; D01D 5/00; D01D 5/0007; D01D 5/247
See application file for complete search history.

(56) References Cited

FOREIGN PATENT DOCUMENTS

| | | |
|---|---|---|
| JP | 05-205720 A | 8/1993 |
| JP | H06-196144 A | 7/1994 |
| JP | 07-057715 A | 3/1995 |
| JP | 2002-008730 A | 1/2002 |
| JP | 2011-207149 A | 10/2011 |
| JP | 2013-016523 A | 1/2013 |

* cited by examiner

SECONDARY BATTERY

BACKGROUND OF THE INVENTION

1. Field of the Invention

The present invention relates to a secondary battery.

Moreover, the present international application claims priority on the basis of Japanese Patent Application No. 2015-093030, which was filed on 30 Apr. 2015, and all the details of that application are incorporated by reference in the present specification.

2. Description of the Related Art

In recent years, secondary batteries such as lithium ion secondary batteries (lithium secondary batteries) and sodium ion secondary batteries have been used as so-called portable power sources for personal computers, hand-held terminals and the like and as power supplies for vehicle propulsion. In particular, lithium ion secondary batteries able to achieve high energy density while being lightweight can be advantageously used as high output power sources for propelling vehicles such as electric vehicles (EV), hybrid vehicles (HV) and plug in hybrid vehicles (PHV).

Typically, a secondary battery is provided with an electrode body, which is obtained by overlaying a positive electrode having a positive electrode active substance layer and a negative electrode having a negative electrode active substance layer, with a separator interposed therebetween, and an electrolyte solution. Here, a porous resin film is typically used as the separator. This type of separator exhibits functions such as electrically insulating the positive electrode from the negative electrode and holding the electrolyte solution.

Typically, this type of secondary battery is a battery in which charging and discharging are carried out by charge carriers (for example, lithium ions) in the electrolyte solution passing between the electrodes. When charging a secondary battery, charge carriers (typically lithium ions) are discharged (released) from the positive electrode active substance that constitutes the positive electrode active substance layer, and the charge carriers are occluded (introduced) into the negative electrode active substance that constitutes the negative electrode active substance layer. During discharging, charge carriers (typically lithium ions) are discharged (released) from the negative electrode active substance, and the charge carriers are occluded (introduced) into the positive electrode active substance. In this way, as charge carriers (typically lithium ions) are occluded into, and discharged from, the active substances when the secondary battery is charged and discharged, the positive and negative electrode active substances (that is, the positive and negative electrode active substance layers that contain the active substances) expand and shrink.

[Patent Document 1] Japanese Patent Application Publication No. 2002-008730
[Patent Document 2] Japanese Patent Application Publication No. 2011-207149
[Patent Document 3] Japanese Patent Application Publication No. H05-205720
[Patent Document 4] Japanese Patent Application Publication No. H07-057715

SUMMARY OF THE INVENTION

By using a secondary battery having the constitution described above in an application in which high rate charging and discharging is repeatedly carried out (for example, automotive applications), the positive and negative electrode active substances (positive and negative electrode active substance layers) undergo repeated expansion and shrinkage as charging and discharging are carried out, which leads to concerns that the electrolyte solution held inside the electrode body (typically inside the separator) will be squeezed out from the electrode body. As a result, variations can occur in terms of the quantity of electrolyte solution held inside the electrode body, and cases can occur where some sections in the electrode body contain large quantities of the electrolyte solution and some sections contain small (insufficient) quantities of the electrolyte solution.

In sections in the electrode body where the quantity of electrolyte solution was small (insufficient), so-called liquid shortage tends to occur. In such sections where the quantity of electrolyte solution is small (typically sections in which liquid shortage occurs), the quantity of electrolyte solution present in the section is less than that required, and the charging and discharging performance of the overall battery tends to deteriorate. In addition, because battery reactions tend to be concentrated in sections of the electrode body in which the quantity of electrolyte solution is relatively large, degradation of these sections tends to occur more quickly. These occurrences are a cause of reduced battery performance (increased battery resistance, reduced battery capacity, and the like), and are therefore not desirable. In secondary batteries used in applications where excellent high rate charging and discharging characteristics are particularly required, it is important to suppress reduced performance caused by variations in the quantity of electrolyte solution in the electrode body.

For example, Japanese Patent Application Publication Nos. 2002-008730, 2011-207149, H05-205720, and H07-057715 each disclose the feature of having a non-woven fabric layer in an electrode body in order to improve retention of the electrolyte solution in the electrode body.

The present invention has been devised in order to solve the existing problems mentioned above, and an objective of the present invention is to provide a secondary battery that exhibits excellent high rate charging and discharging characteristics. Specifically, the present invention provides a secondary battery provided with an electrode body that exhibits excellent retention of an electrolyte solution.

The present invention provides a secondary battery provided with an electrode body having a positive electrode, a negative electrode and a separator that electrically isolates the positive electrode from the negative electrode, and an electrolyte solution. This secondary battery has a non-woven fabric layer between the separator and the positive electrode and/or between the separator and the negative electrode. In addition, at least some of the fibers that constitute the non-woven fabric layer have one non-through hole in each of the fibers, and the non-through hole has an opening in one end of the fiber in a length direction thereof and extends in the length direction of the fiber. Here, the length ($L_W$) from the opening of the non-through hole to the deepest part of the non-through hole in the length direction is 50% or higher of the entire length ($L_F$) of the fiber.

Moreover, in the present specification "secondary battery" generally means a battery which can be repeatedly charged and discharged, and is a term that includes a so-called chemical battery, such as a lithium ion secondary battery, and a physical battery such as an electrical double layer capacitor.

According to this constitution, it is possible for the electrolyte solution to be held in voids in the non-woven fabric layer constituted by a plurality of fibers (a mesh structure) and in non-through holes formed in the fibers that constitute the non-woven fabric layer. In this way, it is possible to increase the quantity of electrolyte solution able to be held in the non-woven fabric layer (that is, in the electrode body). That is, by providing the non-woven fabric layer between the separator and the positive electrode or between the separator and the negative electrode, it is possible to improve retention of the electrolyte solution in the non-woven fabric layer (that is, in the electrode body).

In addition, by using voids formed in the fibers as non-through holes, it is possible to improve the strength of the fibers against pressure in the cross sectional direction compared to a case in which through holes are formed in the fibers. As a result, even in cases where the positive electrode active substance layer (or negative electrode active substance layer) expands during charging and discharging and the non-woven fabric layer is squeezed (compressed), it is possible to prevent the voids formed in the fibers from being squashed.

According to a secondary battery having the constitution described above, it is possible to suppress a deterioration in battery performance caused by variations in the quantity of electrolyte solution in the electrode body, and also possible to provide a secondary battery that exhibits excellent high rate charging and discharging characteristics.

In a preferred aspect of the secondary battery disclosed here, the area ($S_W$) of the opening of the non-through hole is not less than 30% of the sum ($S_T$) of the area ($S_W$) of the opening and the area ($S_F$) of the fiber-constituting part of the fiber when the end of the fiber, in which the opening is formed, is viewed along the length direction of the fiber ($S_T=S_W+S_F$). In addition, the size and shape of the non-through hole are almost the same from the opening to the deepest part of the non-through hole.

By forming a non-through hole having a large opening diameter, the electrolyte solution can easily penetrate into the non-through hole. In addition, by making the diameter of the non-through hole almost the same from the opening to the deepest part of the non-through hole, it is possible to hold a larger quantity of electrolyte solution in the non-through hole than in a case where a non-through hole is formed in such a way that the diameter at the deepest part of the non-through hole is smaller than the diameter at the opening.

In a preferred aspect of the secondary battery disclosed here, the void volume ($V_W$) of the non-through hole per fiber is not less than 20 vol. % of the sum ($V_T$) of the volume ($V_F$) of the fiber-constituting part of the fiber and the void volume ($V_W$) of the non-through hole ($V_T=V_W+V_F$). In such a fiber, the void volume in the fiber is large. As a result, it is possible to hold a larger quantity of electrolyte solution in the fiber. In this way, it is possible to improve retention of the electrolyte solution in the non-woven fabric layer (that is, in the electrode body).

In a preferred aspect of the secondary battery disclosed here, the non-through hole is formed so as to include the central axis in the length direction of the fiber. According to such a feature, it is possible to improve the strength of the fibers against pressure in the cross sectional direction. As a result, squashing of the voids formed in the fibers can be prevented to a high degree.

In a preferred aspect of the secondary battery disclosed here, the non-woven fabric layer contains a binder that binds together fibers that constitute the non-woven fabric layer to each other, and a part of one fiber that constitutes the non-woven fabric layer is bound to a part of another fiber by the binder.

In a non-woven fabric layer having such a constitution, fibers that constitute the non-woven fabric layer are bound by the binder, and even in cases where the non-woven fabric layer is squeezed (compressed), voids formed from a plurality of fibers (a mesh structure) are hardly squashed. That is, even in cases where the positive electrode active substance layer (or negative electrode active substance layer) expands during charging and discharging and the non-woven fabric layer is squeezed (compressed), it is possible to maintain the shape of voids formed from a plurality of fibers (a mesh structure) and possible to hold the electrolyte solution in these voids (mesh structure). Therefore, by providing a non-woven fabric layer having the constitution mentioned above, it is possible to provide a secondary battery that exhibits excellent high rate charging and discharging characteristics.

In a preferred aspect of the secondary battery disclosed here, the content of the binder contained in the non-woven fabric layer is 5 mass % to 20 mass % of the overall non-woven fabric layer.

By setting the content of the binder contained in the non-woven fabric layer to fall within the range mentioned above, the fibers are suitably bound to each other and voids between fibers can be suitably ensured.

DESCRIPTION OF THE PREFERRED EMBODIMENTS

Figure 1:
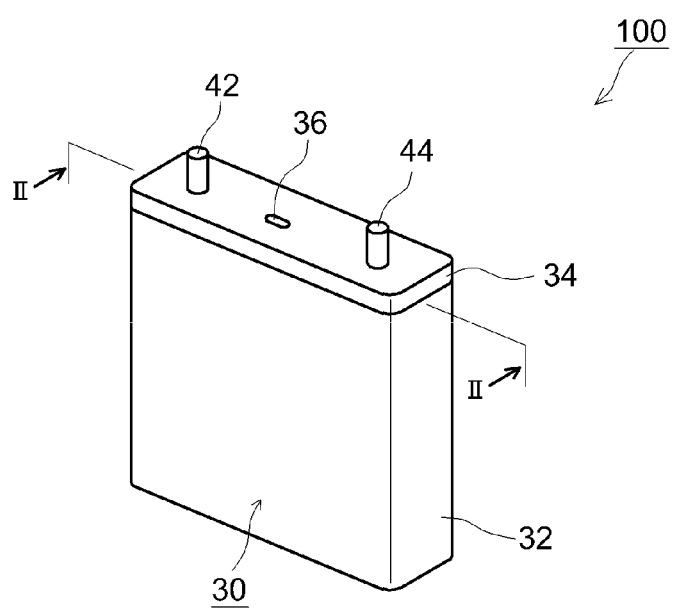
FIG. 1 is a perspective view that schematically illustrates the external shape of a secondary battery according to one embodiment of the present invention.

Preferred embodiments of the present invention will now be explained by referring to the drawings, using a lithium ion secondary battery as an example. Moreover, matters which are essential for carrying out the invention and which are matters other than those explicitly mentioned in the present invention are matters that a person skilled in the art could understand to be matters of design on the basis of the prior art in this technical field. The present invention can be carried out on the basis of the matters disclosed in the present specification and common general technical knowledge in this technical field. In the drawings shown below, members and parts having the same action are explained using the same reference symbols, and duplicate explanations may be omitted or simplified. In addition, dimensions shown in the drawings (lengths, widths, thicknesses, and so on) do not necessarily reflect actual dimensions.

Moreover, a lithium ion secondary battery is merely one example, and the technical concept of the present invention is not limited thereto. For example, other applications can be a variety of secondary batteries in which repeated charging and discharging can be carried out by charge transfer brought about by migration of charge carriers between positive and negative electrodes. Specifically, the technical concept of the present invention encompasses not only lithium ion secondary batteries that use lithium ions as charge carriers, but also other secondary batteries (for example, magnesium secondary batteries, sodium secondary batteries, and the like) provided with other charge carriers (such as magnesium ions or sodium ions).

The secondary battery disclosed here can have a constitution similar to that of a conventional secondary battery, except that the secondary battery has the non-woven fabric layer disclosed here between the positive electrode and the separator and/or between the negative electrode and the separator.

Figure 2:
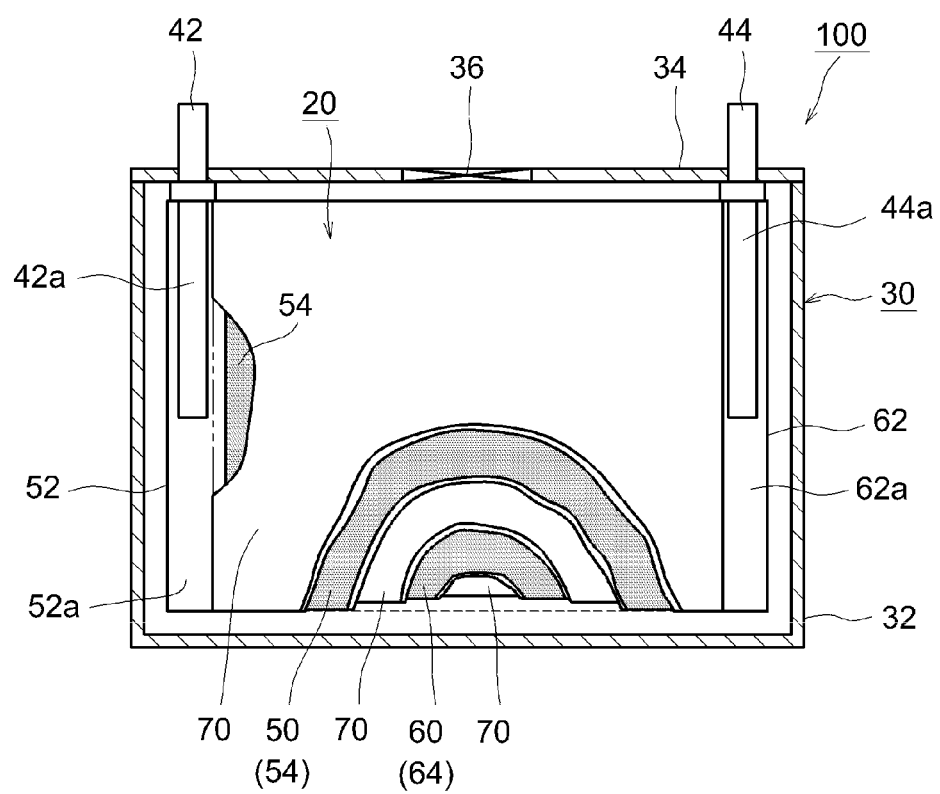
FIG. 2 is a longitudinal sectional view that schematically illustrates the cross sectional structure along the line shown by II-II in FIG. 1.

As shown in FIG. 1 and FIG. 2, the lithium ion secondary battery 100 has a constitution whereby an electrode body 20 (a wound electrode body), which is obtained by flatly winding a long positive electrode (a positive electrode sheet) 50 and a long negative electrode 60 (a negative electrode sheet) 60, with a long separator (a separator sheet) 70 interposed therebetween, is housed in a flat box-like battery case 30 together with an electrolyte solution (not shown).

The lithium ion secondary battery 100 disclosed here is a battery in which the electrode body 20 and the electrolyte solution (not shown) are housed in the battery case 30 (that is, an outer container), as shown in FIGS. 1 and 2. The battery case 30 is constituted from a box shaped (that is, a bottomed cuboid) case main body 32 having an opening on one side (corresponding to the top in a normal battery usage configuration) and a lid 34 that seals the opening on the case main body 32. As shown, a positive electrode terminal 42 for external connection and a negative electrode terminal 44 for external connection are provided on the lid 34. In addition, a safety valve 36 for discharging gas generated inside the battery case 30 to outside the battery case and an introduction hole (not shown) for introducing the electrolyte solution into the battery case are provided on the lid 34. The material of the battery case 30 is preferably a metallic material (or alloy) such as aluminum, an aluminum alloy or stainless steel, or a resin material.

<<Electrode Body 20>>

Figure 4:
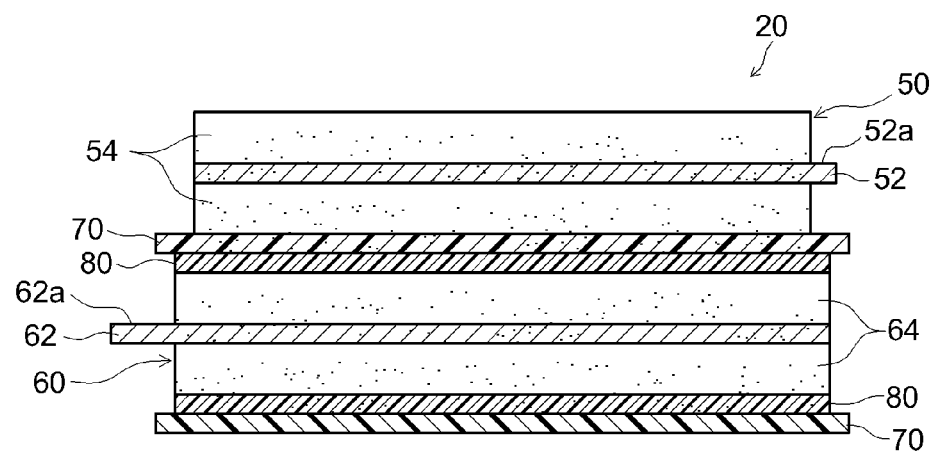
FIG. 4 is a partial cross sectional view that schematically illustrates an expanded view of a part between the positive and negative electrodes in a wound electrode body according to one embodiment.

The electrode body 20 disclosed here has a non-woven fabric layer 80 between the positive electrode 50 and the separator 70 and/or between the negative electrode 60 and the separator 70, as shown in FIG. 4. This electrode body 20 may be, for example, a laminated type electrode body or wound type electrode body. Although not intending to place particular limitations on the present invention, an explanation will be given of the electrode body using a wound type electrode body (a wound electrode body) 20 as an example.

Figure 3:
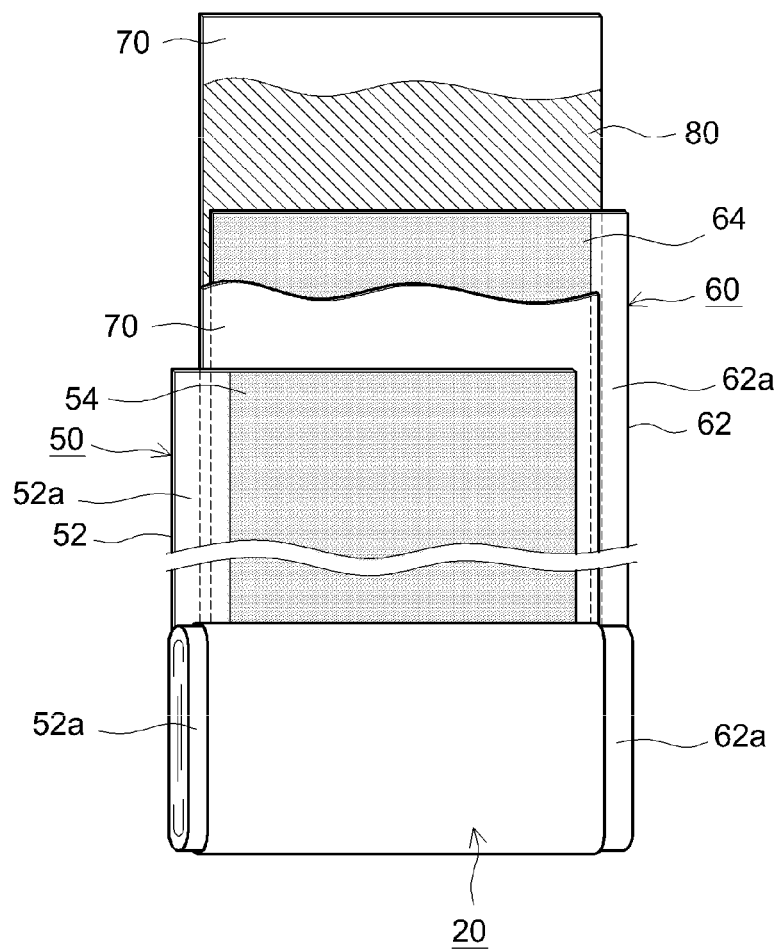
FIG. 3 is a schematic diagram that shows the constitution of a wound electrode body according to one embodiment.

A wound electrode body 20 according to the present embodiment is a long sheet-like structure (a sheet-like electrode body) in a previous stage in which the electrode body is assembled, as shown in FIG. 3. This wound electrode body 20 is provided with a long positive electrode 50, which is obtained by providing a positive electrode active substance layer 54 on the surface of a positive electrode current collector 52, a long negative electrode 60, which is obtained by providing a negative electrode active substance layer 64 on the surface of a negative electrode current collector 62, two long separators 70, and a non-woven fabric layer 80. Although not intending to place particular limitations on the present invention, an explanation will now be given using a mode in which the non-woven fabric layer 80 is formed on the surface of the negative electrode active substance layer 64 as an example of an embodiment of the present invention.

As shown in FIG. 4, the wound electrode body 20 is formed by overlaying the positive electrode (positive electrode sheet) 50 and the negative electrode (negative electrode sheet) 60, in which the non-woven fabric layer 80 is formed on a surface (one surface or both surfaces, both surfaces in this case) of the negative electrode active substance layer 64, with the long separator (separator sheet) 70 interposed between the positive electrode and negative electrode, and then winding in the longitudinal direction. Moreover, this wound electrode body 20 can be formed into a flat shape by carrying out the winding mentioned above and then squeezing the obtained laminated body from the sides.

In this way, the non-woven fabric layer 80 is formed on the surfaces of the negative electrode 60 (the negative electrode active substance layers 64), and by overlaying the negative electrode 60 and the separator 70, it is possible to dispose the non-woven fabric layer 80 between the negative electrode 60 and the separator 70.

Moreover, in the present embodiment, an explanation is given using a mode in which the non-woven fabric layer 80 is formed on the surfaces of the negative electrode 60 (the negative electrode active substance layers 64) as an example, but the present invention is not limited to such a mode as long as the non-woven fabric layer 80 is disposed between the separator 70 and the positive electrode 50 and/or between the separator 70 and the negative electrode 60. For example, the non-woven fabric layer 80 can be formed on a surface (one surface or both surfaces) of the positive electrode 50 (typically on the positive electrode active substance layer 54) or on a surface (one surface or both surfaces) of the separator 70, as shown in FIG. 3.

For example, by forming the non-woven fabric layer 80 on a surface of the positive electrode 50 (the positive electrode active substance layer 54) and overlaying the positive electrode 50 and the separator 70, it is possible to dispose the non-woven fabric layer 80 between the positive electrode 50 and the separator 70. In addition, by forming the non-woven fabric layer 80 on a surface of the separator 70 and overlaying the positive electrode 50, the negative electrode 60 and the separator 70 so that the non-woven fabric layer 80 faces the positive electrode 50 and/or the negative electrode 60, it is possible to dispose the non-woven fabric layer 80 between the positive electrode 50 and the separator 70 and/or between the negative electrode 60 and the separator 70.

Alternatively, it is possible to separately prepare a long sheet-like non-woven fabric layer 80, and overlay the non-woven fabric layer 80, the positive electrode 50, the negative electrode 60 and the separator 70 so that the non-woven fabric layer 80 is disposed between the separator 70 and the positive electrode 50 and/or between the separator 70 and the negative electrode 60.

The non-woven fabric layer 80 should be provided at at least one location selected from among between the negative electrode 60 and one separator 70 and between the positive electrode 50 and one separator 70.

In a preferred embodiment, the non-woven fabric layer is provided at two or more locations (and more preferably three or more locations) selected from among between the negative electrode 60 and one separator 70 and between the positive electrode 50 and one separator 70. Of these, it is more preferable to provide the non-woven fabric layer 80 between the negative electrode 60 and both separators 70 and between the positive electrode 50 and both separators 70. In this way, it is possible to increase the quantity of electrolyte solution able to be held in the electrode body 20. In addition, it is possible to hold a large quantity of electrolyte solution close to the negative electrode active substance layer 64 and the positive electrode active substance layer 54, and also possible to prevent a lack of electrolyte solution (typically liquid shortage) at the negative electrode active substance layer 64 and the positive electrode active substance layer 54.

An electrode body 20 in which the non-woven fabric layer 80 is provided between the negative electrode 60 and both separators 70 and between the positive electrode 50 and both separators 70 should be produced by, for example, forming the non-woven fabric layer 80 on both surfaces of the separator 70, and then overlaying the separator 70 with the positive electrode 50 and the negative electrode 60. Alternatively, the electrode body can be produced by forming the non-woven fabric layer 80 on both surfaces of the positive electrode 50 (the positive electrode active substance 54) and both surfaces of the negative electrode 60 (the negative electrode active substance 64), and then overlaying the positive electrode 50 and the negative electrode 60 with the separator 70.

As shown in FIGS. 2 to 4, a winding core part (that is, a laminated structure obtained by laminating the positive electrode active substance layer 54 of the positive electrode 50, the negative electrode active substance layer 64 of the negative electrode 60 and the separator 70) is formed on the central part of the wound electrode body 20 in the winding axis direction. In addition, a positive electrode active substance layer-non-forming part 52a and a negative electrode active substance layer-non-forming part 62a partially protrude outwards from the winding core part at each edge respectively of the wound core part in the winding axis direction of the wound electrode body 20. A positive electrode current collector sheet 42a and a negative electrode current collector sheet 44a are provided at the positive electrode side protruding part (the positive electrode active substance layer-non-forming part 52a) and the negative electrode side protruding part (the negative electrode active substance layer-non-forming part 62a) respectively, and are electrically connected to a positive electrode terminal 42 and a negative electrode terminal 44 respectively.

<<Non-Woven Fabric Layer 80>>

Figure 7:
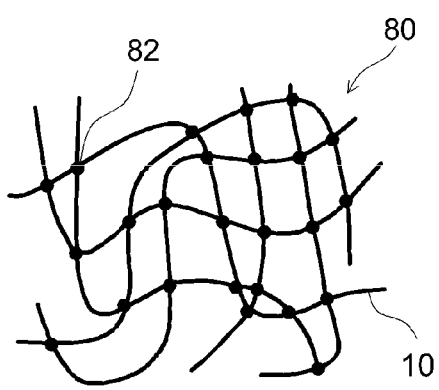
FIG. 7 is a diagram that schematically illustrates the structure of a non-woven fabric layer according to one embodiment.

As shown in FIG. 7, the non-woven fabric layer 80 disclosed here has an integrated three-dimensional structure (a mesh structure) formed by a plurality of fibers 10 aggregating. Typically, the non-woven fabric layer 80 is formed by laminating a plurality of fibers 10 in a random manner. Typically, the non-woven fabric layer 80 has a large number of voids between the fibers 10 that constitute the non-woven fabric layer 80. In other words, a large number of voids, which are formed from the fibers 10 that constitute the non-woven fabric 80, are present in the non-woven fabric 80. That is, the non-woven fabric layer 80 has a high porosity (typically 40% or higher, for example 50 to 70%).

By holding the electrolyte solution in the voids (the mesh structure) between the fibers 10 that constitute the non-woven fabric layer 80, it is possible to increase the quantity of electrolyte solution able to be held in the electrode body 20 having the non-woven fabric layer 80. Therefore, by having the non-woven fabric layer 80 in the electrode body 20, the occurrence of liquid shortage in the electrode body 20 can be suitably prevented.

In addition, because the non-woven fabric layer 80 has a high porosity, the electrolyte solution can penetrate easily into the non-woven fabric layer 80. Therefore, by having the non-woven fabric layer 80 in the electrode body 20, the electrolyte solution can penetrate smoothly into the electrode body 20. In particular, a wound electrode body 20 is such that the size of the electrolyte solution inlet port (the end in the penetration direction) tends to be particularly narrow relative to the electrode area, and fluctuations in electrolyte solution penetration in the electrode body readily occur. Therefore, providing the non-woven fabric layer 80 is particularly effective for allowing the electrolyte solution to penetrate efficiently into the electrode body 20.

The average thickness of the non-woven fabric layer 80 is not particularly limited, but if the average thickness of the non-woven fabric layer 80 is too high, the energy density of the battery deteriorates. Therefore, it is preferable for the average thickness of the non-woven fabric layer 80 to be, for example, 30 μm or lower (and more preferably 20 μm or lower). Meanwhile, if the average thickness of the non-woven fabric layer 80 is extremely low, retention of the electrolyte solution in the non-woven fabric layer tends to deteriorate. In addition, the non-woven fabric layer 80 tends to be difficult to produce. Therefore, it is preferable for the average thickness of the non-woven fabric layer 80 to be, for example, 5 μm or higher (and more preferably 10 μm or higher). The average thickness of the non-woven fabric layer 80 can be determined by, for example, analysis using cross sectional SEM images.

In addition, from the perspective of supplying the electrolyte solution, which is held in the non-woven fabric layer 80, to the positive electrode active substance layer 54 and negative electrode active substance layer 64 and using the electrolyte solution in a battery reaction, it is preferable for the non-woven fabric layer 80 to be of a size that at least covers the part where the positive electrode active substance layer 54 faces the negative electrode active substance layer 64 when the electrode body is constructed. For example, it is more preferable for the length of the non-woven fabric layer 80 in the width direction, which is perpendicular to the length direction, to be greater than the length of the positive electrode active substance layer 54 in the width direction, which is perpendicular to the length direction (and preferably greater than the length of the negative electrode active substance layer 64 in the width direction, which is perpendicular to the length direction, and more preferably the same length as the length of the separator 70 in the width direction, which is perpendicular to the length direction). For example, the non-woven fabric layer 80 should be the same size as the separator 70.

The length ($L_F$) of the fibers 10 that constitute the non-woven fabric layer 80 is not particularly limited. By using long fibers, the fibers become thoroughly entangled with each other and it is possible to form a non-woven fabric layer 80 which exhibits high mechanical strength and which tends not to be crushed. Therefore, the average value of the length ($L_F$) of the fibers 10 is preferably 10 mm or higher, more preferably 30 mm or higher, and further preferably 50 mm or higher. The upper limit of the fiber length ($L_F$) should be, for example, 200 mm or lower, and typically 100 mm or lower.

The fiber diameter ($R_F$) of the fibers 10 that constitute the non-woven fabric layer 80 is not particularly limited. By using fine fibers, it is possible to produce a non-woven fabric layer 80 having a higher number of voids (that is, a higher porosity). In this way, it is possible to increase the quantity of electrolyte solution able to be held in the non-woven fabric layer 80 (that is, it is possible to improve the liquid retention properties of the non-woven fabric layer 80). In addition, fibers 10 having a small fiber diameter ($R_F$) are also preferred from the perspective of producing a thinner non-woven fabric layer 80. Therefore, it is preferable for the average value of the fiber diameter ($R_F$) of the fibers 10 to be, for example, 200 nm or lower (and preferably 150 nm or lower). Meanwhile, the lower limit for the fiber diameter ($R_F$) is not particularly limited, but if the fiber diameter ($R_F$) is too small, the mechanical strength of the non-woven fabric layer 80 tends to deteriorate. In addition, fibers 10 having a fiber diameter ($R_F$) that is too small break readily, and it can be difficult to form the non-woven fabric layer 80. Therefore, the average value of the fiber diameter ($R_F$) should be, for example, 50 nm or higher. In general, the fibers 10 can have a fiber diameter ($R_F$) of approximately 100 nm.

Figure 5:
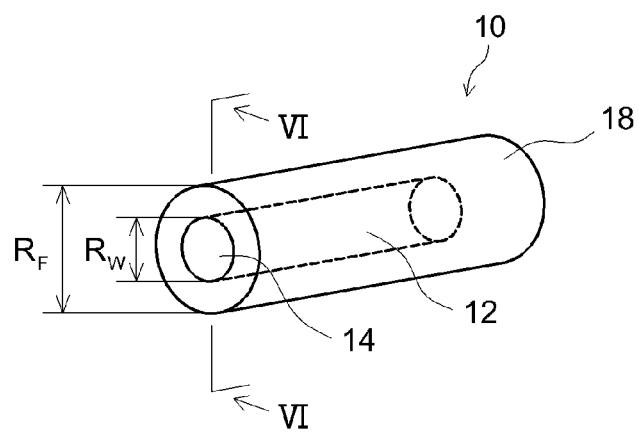
FIG. 5 is a perspective view that schematically illustrates the constitution of a fiber according to one embodiment of the present invention.
Figure 6:
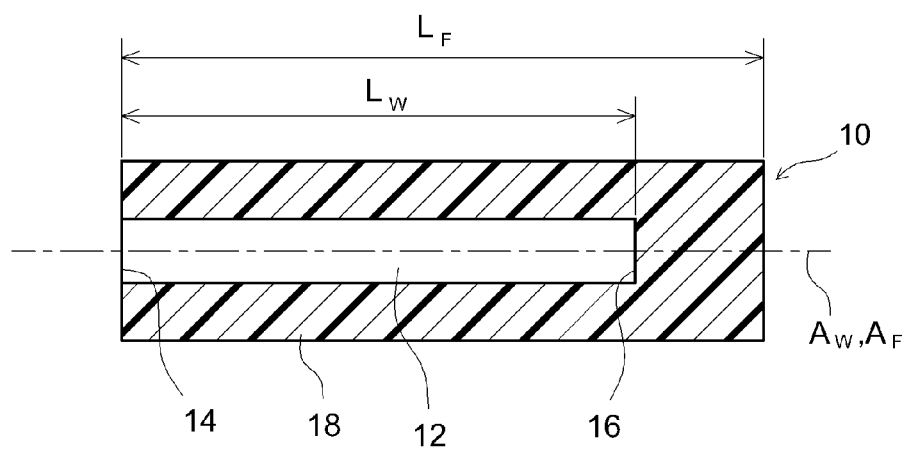
FIG. 6 is a sectional view that schematically illustrates the cross sectional structure along the line shown by VI-VI in FIG. 5.

As shown in FIG. 5 and FIG. 6, some of the fibers 10 (and preferably substantially all of the fibers) that constitute the non-woven fabric layer 80 have an opening 14 in one end of the fiber 10 in the length direction, and a non-through hole 12 extending in the length direction of the fiber is formed in each fiber.

In addition, the length ($L_W$) from the opening 14 of the non-through hole 12 to the deepest part 16 of the non-through hole 12 in the length direction (hereinafter, this length is also referred to as the "non-through hole depth") is 50% or higher of the entire length ($L_F$) of the fiber 10. As the depth ($L_W$) of the non-through hole 12 increases, it is possible to increase the quantity of electrolyte solution able to be held in the non-through hole 12. Therefore, the depth ($L_W$) of the non-through hole 12 is preferably 60% or higher, and more preferably 70% or higher, of the entire length ($L_F$) of the fiber 10. Meanwhile, if the depth ($L_W$) of the non-through hole 12 is too great relative to the entire length ($L_F$) of the fiber 10, the strength of the fiber 10 in the cross sectional direction can deteriorate (typically, the non-through hole 12 is crushed easily). Therefore, the depth ($L_W$) of the non-through hole 12 is preferably not more than 95% (for example, not more than 90%) of the entire length ($L_F$) of the fiber.

Moreover, from the perspective of retention of the electrolyte solution, the average value of the depth ($L_W$) of the non-through hole 12 is preferably 5 mm or higher, more preferably 10 mm or higher, and further preferably 20 mm or higher. Meanwhile, if the non-through hole 12 is too deep, it tends to be difficult for the electrolyte solution to penetrate into the deep part of the non-through hole 12. In addition, it is difficult for electrolyte solution that has penetrated into the deep part of an excessively deep non-through hole 12 to be supplied to those parts of the electrode body 20 where there is a shortage of electrolyte solution. Therefore, the average value of the depth ($L_W$) of the non-through hole 12 is preferably 80 mm or lower, and more preferably 50 mm or lower.

In addition, a non-through hole 12 having a shape whereby the shape and size are almost the same from the opening 14 formed at one end of the fiber 10 in the length direction to the deepest part 16 of the non-through hole 12 is preferred from perspectives such as facilitating penetration of the electrolyte solution and facilitating supply of the penetrated electrode solution into the electrode body 20 (for example, the negative electrode active substance layer 64 and the positive electrode active substance layer 54). The shape of the opening 14 is not particularly limited, but can be a shape that is similar to the cross sectional shape of the fiber 10. A non-through hole 12 in which the opening 14 is approximately circular (including circular and elliptical, preferably circular) is preferred from the perspectives of electrolyte solution penetration and being able to supply the electrolyte solution smoothly.

In addition, the area (size) ($S_W$) of the opening 14 of the non-through hole 12 is preferably 30% or higher, and more preferably 40% or higher, of the sum ($S_T$) of the area ($S_F$) of the fiber-constituting part 18 of the fiber 10 when the end of the fiber 10 in which the opening of the non-through hole 12 is formed is viewed along the length direction of the fiber and the area ($S_W$) of the opening 14 ($S_T=S_W+S_F$). A non-through hole 12 in which the area (size) ($S_W$) of the opening 14 is large facilitates penetration of the electrolyte solution into the non-through hole and facilitates supply of the penetrated electrolyte solution into the electrode body 20 (for example, the negative electrode active substance layer 64 and the positive electrode active substance layer 54). The upper limit of the area ($S_W$) of the opening 14 of the non-through hole 12 is not particularly limited, but from the perspective of ensuring the strength of the fiber 10 (that is, the strength of the fiber 10 against forces in the cross sectional direction), the area ($S_W$) of the opening 14 of the non-through hole 12 can be not more than 95% (for example, not more than 90%) of the sum ($S_T$) of the area ($S_F$) of the fiber-constituting part 18 of the fiber 10 when the end of the fiber 10 in which the opening 14 is formed is viewed along the length direction of the fiber 10 and the area ($S_W$) of the opening 14.

For example, the opening 14 of the non-through hole 12 can be an approximately circular shape (and preferably a circular shape), and the diameter ($R_W$) of the opening 14 can be not less than 40% (for example, not less than 50%) and not more than 95% (for example, not more than 90%) of the diameter $R_F$ of the fiber 10 (that is, the fiber diameter).

In addition, as the void volume ($V_W$) of the non-through hole 12 in the fiber 10 increases, it is possible to increase the quantity of electrolyte solution able to be held in the fiber 10. Therefore, the void volume ($V_W$) of the non-through hole 12 per fiber 10 is preferably not less than 20 vol. %, more preferably not less than 30 vol. %, and further preferably not less than 40 vol. %, of the sum ($V_T$) of the volume ($V_F$) of the fiber-constituting part 18 of the fiber 10 and the void volume ($V_W$) of the non-through hole 12 ($V_T=V_W+V_F$). Meanwhile, if the void volume ($V_W$) of the non-through hole 12 in the fiber 10 is too great, the strength of the fiber 10 tends to decrease (the non-through hole 12 tends to be crushed easily). Therefore, the void volume ($V_W$) of the non-through hole 12 per fiber 10 is preferably not more than 80 vol. %, and more preferably not more than 70 vol. %, of the sum ($V_T$) of the volume ($V_F$) of the fiber-constituting part 18 of the fiber 10 and the void volume ($V_W$) of the non-through hole 12.

In addition, it is preferable for the non-through hole 12 to be formed so as to include the central axis $A_F$ in the length direction of the fiber 10. In this way, both penetration of the electrolyte solution into the non-through hole 12 and strength of the fiber 10 can be achieved to a high degree. For example, the non-through hole 12 can be formed so that the central axis $A_W$ in the length direction of the non-through hole 12 and the central axis $A_F$ in the length direction of the fiber 10 are approximately parallel to each other. The difference between the central axis $A_W$ in the length direction of the non-through hole 12 and the central axis $A_F$ in the length direction of the fiber 10 (the distance between the central axes $A_W$ and $A_F$ at the point where these axes are furthest from each other) is preferably not more than 10%, and more preferably not more than 5%, of the fiber diameter ($R_F$) (the diameter of the fiber 10). It is more preferable for the central axis $A_W$ in the length direction of the non-through hole 12 and the central axis $A_F$ in the length direction of the fiber 10 to be substantially the same.

The fiber 10 can be a fiber having the prescribed shape (the shape of the non-through hole), and can be constituted from a material having sufficient strength to be able to maintain the shape of the non-through hole 12 formed in the fiber 10. In addition, it is preferable for the material that constitutes the fiber 10 to be a material that exhibits electrolyte solution resistance (and especially resistance to corrosion by the electrolyte solution). Synthetic resin materials can be given as examples of such materials. By using a synthetic resin as the material that constitutes the fiber 10, a fiber 10 having the prescribed shape can be formed relatively easily.

For example, polyamide resins such as aramid resins and nylon resins (for example, nylon 12 and nylon 66), poly(phenylene sulfide) (PPS), poly(vinyl alcohol) (PVA), polyamideimides, polysulfones, polyacrylonitrile, and the like can be advantageously used as the synthetic resin that constitutes the fiber 10. It is possible to use one of these synthetic resin materials in isolation or a combination of two or more types thereof.

The non-woven fabric layer 80 may be, for example, an integrated sheet-like layer obtained by entangling the fibers 10 without binding the fibers, a layer obtained by directly binding the fibers 10 at intersection points, or a layer obtained by binding the fibers 10 at intersection points using a binder 82, as shown in FIG. 7. It is preferable for a part of one fiber 10 that constitutes the non-woven fabric layer 80 to be bound to a part of another fiber 10, and more preferable for the fibers 10 to be bound to each other by means of the binder 82. In this way, it is possible to maintain a high degree of voids (a mesh structure) between the fibers of the non-woven fabric layer 80. That is, even in cases where the positive electrode active substance layer 54 (or negative electrode active substance layer 64) expands as a result of charging and discharging and the non-woven fabric layer 80 is squeezed (compressed), it is possible to maintain the shape of voids formed from a plurality of the fibers 10 (a mesh structure).

The binder 82 is not particularly limited, and it is possible to use a publicly known material that was used in the past when producing secondary batteries. For example, styrene-butadiene rubbers (SBR), poly(vinylidene fluoride) (PVDF), polytetrafluoroethylene (PTFE), carboxymethyl cellulose (CMC), acrylic resins, and the like can be advantageously used.

The quantity of the binder 82 contained in the non-woven fabric layer 80 is preferably 5 mass % to 20 mass % relative to the overall mass (100 mass %) of the non-woven fabric layer. For example, this quantity can be approximately 12 mass % of the overall non-woven fabric layer. If the quantity of the binder 82 contained in the non-woven fabric layer 80 is too low, binding of the fibers 10 tends to be insufficient. Meanwhile, if the quantity of the binder 82 contained in the non-woven fabric layer 80 is too high, the porosity of the non-woven fabric layer 80 tends to decrease. By setting the content of the binder 82 contained in the non-woven fabric layer 80 to fall within the range mentioned above, the fibers 10 are suitably bound to each other and voids in the non-woven fabric layer 80 can be suitably maintained.

The method for producing the non-woven fabric layer 80 is not particularly limited, and a conventional publicly known method can be used.

For example, a preferred example of a method for producing the non-woven fabric layer 80 is an electrospinning method (also known as a static spinning method). Generally speaking, an electrospinning method is a method that involves applying a high-voltage to the tip of a spinning nozzle that houses a solution type spinning material (typically a polymer solution or polymer dispersion), and spinning a fiber 10 by spraying the thus charged spinning material from the spinning nozzle. By recovering fibers 10 using a collector (also known as a counter electrode or collecting electrode substrate), it is possible to produce the non-woven fabric 80. Moreover, by carrying out rolling treatment (pressing treatment) if necessary, the properties (average thickness, porosity, basis weight, and the like) of the non-woven fabric layer 80 can be adjusted.

A simple explanation will now be given of one aspect of a method for producing the non-woven fabric layer 80 using an electrospinning method.

First, a solution type fiber-forming composition is prepared by dissolving (or melting or dispersing) the material that constitutes the fiber 10 (typically a synthetic resin component) and other materials used where necessary in an appropriate solvent (for example, water, NMP, or the like). The fiber-forming composition is housed in a spinning nozzle (typically in a solution tank connected to the spinning nozzle), and the fiber-forming composition is supplied (typically extruded) to the tip of the spinning nozzle at an appropriate speed (supply rate). Next, by applying a high voltage to the tip of the spinning nozzle (generally a voltage of 10 kV to 30 kV, for example 10 kV to 15 kV, relative to the collector that collects the fibers), the charged fiber-forming composition is sprayed from the spinning nozzle. Generally, the solvent in the fiber-forming composition is rapidly evaporated after being sprayed from the spinning nozzle. In this way, prescribed fibers 10 are produced (spun) from the fiber-forming composition using an electrospinning method. By overlaying and collecting the obtained fibers 10 in the form of a sheet on the collector, it is possible to form the non-woven fabric layer 80.

According to this electrospinning method, the non-woven fabric 80 can be formed directly on a surface of the negative electrode 60 (or the positive electrode 50 or separator 70).

For example, in a case where the non-woven fabric layer 80 is to be formed directly on a surface of the negative electrode 60 (the negative electrode active substance layer 64), the negative electrode 60 should be placed on the collector and the fibers 10 obtained by the electrospinning method should be overlaid on the negative electrode 60. Moreover, the same process applies to a case where the non-woven fabric layer 80 is to be formed directly on a surface of the positive electrode 50 (the positive electrode active substance layer 54) or a surface of the separator 70.

It is preferable for the non-woven fabric layer 80 to be formed on the entire surface of the negative electrode active substance layer 64 (or the positive electrode active substance layer 54 or separator 70), that is, across the entire length and entire width of the negative electrode active substance layer 64 (or the positive electrode active substance layer 54 or separator 70).

According to this electrospinning method, fibers 10 having non-through holes 12 can be produced (spun) relatively easily. A simple explanation will now be given of one aspect of a method for producing fibers 10 having non-through holes 12 by an electrospinning method.

Figure 8:
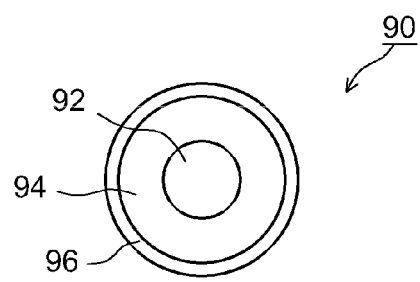
FIG. 8 is a diagram that schematically illustrates the shape of a spinning nozzle of an electrospinning apparatus used to spin a fiber according to one embodiment of the present invention, when the tip of the spinning nozzle is viewed from the collector side.

First, a spinning nozzle 90, which has a first supply port 92 for supplying air (a gas) and a second supply port 94 for spraying (supplying) the material that constitutes the fibers 10 (that is, the solution type fiber-forming composition mentioned above) and in which the second supply port 94 is disposed so as to surround the first supply port 92 (typically in the form of concentric circles), as shown in FIG. 8, is prepared. Next, by appropriately adjusting the timing and speed with which air is supplied from the first supply port 92 (the air supply rate) and the timing and the speed with which the fiber-forming composition is supplied (extruded) from the second supply port 92, it is possible to produce a fiber 10 having a non-through hole 12.

For example, supply of the fiber-forming composition from the second supply port 94 is initiated while air is supplied from the first supply port 92 at a quantity (speed) whereby a void can be formed in the length direction of the fiber 10, after which the quantity (speed) at which the air is supplied from the first supply port 92 is reduced (typically stopped) before the supply of the fiber-forming composition from the second supply port 94 is stopped. In this way, it is possible to produce (spin) a long fiber 10 provided with a non-through hole 12 having an opening 14 at one end in the length direction of the fiber 10.

Alternatively, it is possible to initiate the supply of the fiber-forming composition from the second supply port 94 and then initiate supply of air from the first supply port 92 (after initiating the supply of the fiber-forming composition). Next, air is supplied from the first supply port 92 at a quantity (speed) whereby a void can be formed in the length direction of the fiber 10 until the supply of the fiber-forming composition from the second supply port 94 is terminated. In this way also, it is possible to produce (spin) a fiber 10 provided with a non-through hole 12 having an opening 14 at one end in the length direction of the fiber 10.

In addition, the properties (fiber diameter, fiber length, size of non-through hole 12, and the like) of the fiber 10 can be adjusted by adjusting the composition of the fiber-forming composition, the shape of the tip of the spinning nozzle 90 (for example, the size of each supply port), the timing and speed with which air is supplied from the first supply port 92, the timing and speed with which the fiber-forming composition is supplied from the second supply port 94, the magnitude of the voltage applied to the tip of the spinning nozzle 90, and the like.

In addition, a non-woven fabric layer 80 in which a part of one fiber 10 that constitutes the non-woven fabric layer 80 is bound to a part of another fiber 10 by means of the binder 82 (see FIG. 7) can be produced by, for example, applying the binder 82 to the surface of the fibers 10 that constitute the non-woven fabric layer 80 while forming the non-woven fabric layer 80 by overlaying the fibers 10. For example, by preparing a spinning nozzle 90 in which a third supply port 96 for supplying the binder 82 is disposed so as to surround the second supply port 94 (typically in the form of concentric circles), as shown in FIG. 8, and supplying the binder 82 from the third supply port 96 with appropriate timing, it is possible to apply the binder 82 to the surface of the fiber 10. Such a method is preferred as a method for applying the binder 82 to those parts of the surface of the fiber 10 other than the non-through hole 12, and is preferred because the non-through hole 12 (for example, the opening 14 of the non-through hole 12) is not easily filled with the binder 82.

For example, by adjusting the speed (supply rate) and timing with which the binder 82 is supplied from the third supply port 96, it is possible to apply a prescribed quantity of the binder 82 to the surface of the fiber 10 (that is, it is possible to adjust the content of the binder 82 in the non-woven fabric layer 80).

This electrospinning method can easily produce a fiber 10 having an extremely small fiber diameter at the nanometer to sub-micron level (typically nanofibers), and enables not only the fiber diameter, but also the form of the fiber, the blending ratio of the synthetic resin component in the fiber and the orientation of fibers in the non-woven fabric layer to be adjusted relatively easily. In addition, this electrospinning method is suitable for producing a non-woven fabric layer 80 having a low average thickness.

<<Positive Electrode 50>>

An electrically conductive member consisting of a metal that exhibits good electrical conductivity (for example, aluminum, nickel, titanium or stainless steel) can be preferably used as the positive electrode current collector 52 that constitutes the positive electrode 50. The positive electrode active substance layer 54 contains at least a positive electrode active substance. For example, a lithium complex oxide having a layered structure or spinel structure (for example, $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$ or $LiFePO_4$) can be advantageously used as the positive electrode active substance. In addition, the positive electrode active substance layer 54 can contain components other than the active substance, such as an electrically conductive material or a binder. Carbon black such as acetylene black (AB) or other carbon materials (graphite or the like) can be advantageously used as the electrically conductive material. PVDF or the like can be used as the binder.

<<Negative Electrode 60>>

An electrically conductive member consisting of a metal that exhibits good electrical conductivity (for example, copper, nickel, titanium or stainless steel) can be preferably used as the negative electrode current collector 62 that constitutes the negative electrode 60. The negative electrode active substance layer 64 contains at least a negative electrode active substance. For example, a carbon material such as graphite, hard carbon or soft carbon can be used as the negative electrode active substance. In addition, the surface of the carbon material (the carbon material that forms the core) can be coated with a non-crystalline carbon film. The negative electrode active substance layer 64 can contain components other than the active substance, such as a binder or a thickening agent. A styrene-butadiene rubber (SBR) or the like can be used as the binder. For example, carboxymethyl cellulose (CMC) or the like can be used as the thickening agent.

<<Separator 70>>

The separator 70 can be a separator consisting only of a separator base material made of a resin. Alternatively, the separator 70 can be a separator obtained by providing one or both surfaces of a separator base material (a base material layer) with a heat-resistant layer having the property of shape retention (a slight degree of deformation is allowed) without softening or melting even when the temperature inside the battery is high (for example, 150° C. or higher, and typically 200° C. or higher).

Preferred examples of the separator base material (base material layer) include porous resin sheets comprising resins such as polyethylene (PE), polypropylene (PP), polyesters, cellulose and polyamides. Of these, a polyolefin-based porous resin (for example, PE or PP) is preferred due to the shutdown temperature being significantly lower than the heat resistance temperature of the battery.

The separator base material (base material layer) may be a single layer structure consisting of a single porous resin, but may also be a structure in which two or more types of porous resin sheet having different materials or properties (thicknesses, porosities, and the like) are laminated (for example, a two layer structure obtained by laminating PE and PP, or a three layer structure obtained by laminating a polypropylene (PP) layer on both surfaces of a polyethylene (PE) layer).

The heat-resistant layer is porous, and contains, for example, heat-resistant fine particles and a binder. Particles used as inorganic fillers in heat-resistant layers of secondary battery separators can be advantageously used as the heat-resistant fine particles. For example, alumina, boehmite, silica, titania, calcia, magnesia, zirconia, boron nitride, aluminum nitride, and the like can be used as the inorganic filler. These compounds have high melting points and exhibit excellent heat resistance. It is possible to use one of these inorganic fillers in isolation, or a combination of two or more types thereof.

The form of the filler is not particularly limited, and may be, for example, particulate, fibrous, plate-like (flaky) or the like. In addition, the average particle diameter of the filler is, for example, 0.2 μm or higher, and can be approximately 1.8 μm or lower (for example, 1.2 μm or lower, and typically 1.0 μm or lower). In addition, the specific surface area of the filler is approximately 1.3 $m^2/g$ or higher (for example, 2 $m^2/g$ or higher, and typically 2.8 $m^2/g$ or higher), and 50 $m^2/g$ or lower. By setting the particle diameter and specific surface area of the filler to fall within the ranges mentioned above, it is possible to adjust the degree of adhesion of the heat-resistant layer to the base material layer, the porosity of the heat-resistant layer and the air permeability of the separator 70 within suitable ranges.

In the present specification, the average particle diameter of the filler means the particle diameter corresponding to a cumulative 50% from the small particle diameter side in a volume-based particle size distribution measured using particle size distribution measurements obtained using a conventional laser diffraction/light-scattering method (that is, the $D_{50}$ particle diameter or median diameter). The particle diameter of the inorganic filler can be adjusted by, for example, a means such as pulverizing or sieving. In addition, the term "specific surface area" in the present specification means ordinary BET specific surface area.

For example, an acrylic resin, an aramid resin, poly(vinylidene fluoride) (PVDF), carboxymethyl cellulose (CMC), or the like can be preferably used as the binder contained in the heat-resistant layer. Moreover, it is possible to use one of these binders in isolation, or a combination of two or more types thereof.

In a preferred aspect, the total quantity of the filler and the binder relative to the mass of the overall heat-resistant layer (calculated in terms of solid content) is approximately 90 mass % or higher (for example, 95 mass % or higher). The heat-resistant layer may be constituted essentially from only the filler and the binder. In addition, the proportion of the binder in the heat-resistant layer may be, for example, not less than 3 mass % (and typically not less than 10 mass %) and not more than 70 mass % (and typically not more than 50 mass %) of the overall heat-resistant layer. By setting the quantity of the binder in the heat-resistant layer to fall within the range mentioned above, it is possible to improve adhesion (typically, peel strength) of the base material layer to the heat-resistant layer.

The two separators 70 provided in the wound electrode body 20 may be separators having different materials or properties (that is, the constitutions of the base material layer and heat-resistant layer). In addition, in cases where heat-resistant layers are formed on both surfaces of the base material layer, the properties and constitutions (for example, the type or proportion of the contained filler, the porosity, the average thickness, and the like) of the heat-resistant layers may be different from each other. In addition, in cases where a heat-resistant layer is formed on only one surface of the base material layer, the heat-resistant layer may face either the positive electrode 50 or the negative electrode 60.

<<Electrolyte Solution>>

Typically, an electrolyte solution (that is, a non-aqueous electrolyte solution) obtained by incorporating a supporting electrolyte in an appropriate non-aqueous solvent (typically an organic solvent) can be used as the electrolyte solution.

A variety of organic solvents used in ordinary non-aqueous electrolyte secondary batteries can be used without particular limitation as the non-aqueous solvent. For example, aprotic solvents such as carbonate compounds, ether compounds, ester compounds, nitrile compounds, sulfone compounds and lactone compounds can be used without particular limitation. Of these, carbonates such as ethylene carbonate (EC), diethyl carbonate (DEC), dimethyl carbonate (DMC), ethyl methyl carbonate (EMC) and propylene carbonate (PC) can be advantageously used.

For example, lithium salts such as $LiPF_6$, $LiClO_4$, $LiAsF_6$, $Li(CF_3SO_2)_2N$, $LiBF_4$ and $LiCF_3SO_3$ can be advantageously used as the supporting electrolyte. It is possible to use one of these supporting electrolytes in isolation or a combination of two or more types thereof. $LiPF_6$ is particularly preferred. Therefore, the concentration of the supporting electrolyte is, for example, preferably 0.1 mol/L or higher (for example, 0.8 mol/L or higher) and 2 mol/L or lower (for example, 1.5 mol/L or lower). This concentration is preferably 1.1 mol/L.

Furthermore, the non-aqueous electrolyte solution may further contain components other than the non-aqueous solvent and supporting electrolyte as long as the effect of the present invention is not significantly impaired. These optional components may be used for one or two or more purposes, such as improving the output performance of the battery, improving storage stability (suppressing a decrease in battery capacity during storage), improving cycle characteristics and improving initial charging and discharging efficiency. Examples of preferred additives include gas generating agents such as biphenyl (BP) and cyclohexylbenzene (CHB); coating film-forming agents such as oxalate complex compounds containing boron atoms and/or phosphorus atoms (for example, lithium bis(oxalato)borate $(LiB(C_2O_4)_2)$ and lithium difluoro bis(oxalato) phosphate $(LiPF_2(C_2O_4)_2)$, vinylene carbonate (VC), vinyl ethylene carbonate (VEC), fluoroethylene carbonate (FEC), ethylene sulfite (ES), propane sultone (PS), lithium bis(trifluoromethanesulfonyl)imide (LiTFSI) and fluorophosphate salts (monofluorophosphate salts ($Li_2PO_3F$), difluorophosphate salts ($LiPO_2F_2$), and the like); dispersing agents; thickening agents; and the like. It is possible to use one of these additives in isolation or an appropriate combination of two or more types thereof.

The secondary battery disclosed here is a secondary battery in which variations in the quantity of electrolyte solution in the electrode body, which can occur as a result of repeated high rate charging and discharging, is suppressed even in cases where the secondary battery is used in applications where repeated high rate charging and discharging occurs. As a result, this secondary battery achieves excellent high rate charging and discharging characteristics. Therefore, by utilizing these characteristics, the secondary battery disclosed here can be advantageously used as a motive power source fitted to a vehicle such as a plug-in hybrid vehicle (PHV), a hybrid vehicle (HV) or an electric vehicle (EV). In addition, the present invention provides a vehicle that is preferably equipped with the secondary battery disclosed here as a driving power source (typically a battery pack obtained by electrically connecting a plurality of these secondary batteries).

Working examples (experimental examples) relating to the present invention will now be explained, but the present invention is in no way limited to these working examples (experimental examples).

Lithium ion secondary batteries (non-aqueous electrolyte secondary batteries) according to Examples 1 to 19 shown in Table 1 were constructed using the following materials and processes.

EXAMPLE 1

A negative electrode was produced according to the following procedure. First, graphite (C), the surface of which was coated with non-crystalline carbon, was prepared as a negative electrode active substance powder. Next, a slurry-like negative electrode active substance layer-forming composition was prepared by mixing ion exchanged water with this graphite (C), a styrene-butadiene rubber (SBR) as a binder and CMC as a thickening agent at a C:SBR:CMC mass ratio of 98:1:1. A negative electrode sheet was prepared by coating this composition in a band-like manner on both surfaces of a long copper foil having a thickness of 10 μm (a negative electrode current collector), drying and then pressing. Moreover, the coating weight and pressing conditions of the negative electrode active substance layer-forming composition were adjusted so that the average thickness of the negative electrode was approximately 80 μm (the average thickness of the negative electrode active substance layer on each side was approximately 35 μm).

Next, a non-woven fabric layer was formed by means of an electrospinning method on the negative electrode active substance layer (both negative electrode active substance layers in this case) of the negative electrode.

This electrospinning method used an electrospinning apparatus provided with a high voltage power source, a solution tank, a needle nozzle (spinning nozzle) and a syringe pump. The voltage applied to the spinning nozzle (the tip of the needle nozzle) was 10 kV to 15 kV, and the distance between the spinning nozzle and the surface on which the non-woven fabric layer was formed (the surface of the negative electrode active substance layer in this case) (the distance between the electrodes) was 10 cm to 20 cm. Next, the negative electrode was placed on a collector (also known as a counter electrode or collecting electrode substrate) in such a way that the surface on which the non-woven fabric layer was to be formed faced the needle nozzle (spinning nozzle).

Here, a nozzle in which the tip of the nozzle (spinning nozzle) had a form whereby 3 supply ports were disposed in the form of concentric circles, as shown in FIG. 8, that is, a form whereby a second supply port surrounded a first supply port, which was disposed at the center-most position of the needle nozzle, in the form of concentric circles, and a third supply port surrounded the second supply port in the form of concentric circles, was used as the needle nozzle.

PVA was used as the constituent material of the fiber. A solution type fiber-forming composition was prepared by dissolving this PVA in water, and this composition was housed in a solution tank that was connected to the second supply port of the needle nozzle. This fiber-forming composition was extruded from the solution tank to the second supply port of the needle nozzle (spinning nozzle) by means of the syringe pump. That is, the fiber-forming composition was supplied from the second supply port of the needle nozzle.

In addition, a SBR was used as a binder. A binder solution was prepared by dispersing this SBR in water, and the binder solution was housed in a solution tank connected to the third supply port of the needle nozzle.

The fibers that constitute the non-woven fabric layer were spun by means of an electro spinning method according to the following procedure.

First, supply of the fiber-forming composition from the second supply port was initiated while air was supplied from the first supply port at a quantity (speed) whereby a void could be formed in the length direction of the fiber. At this point, the fiber-forming composition was supplied at a supply rate (supply speed) of 0.2 mL/min to 0.3 mL/min.

Next, several seconds (approximately 2 to 3 seconds) after initiating the supply of the fiber-forming composition, the supply of the fiber-forming composition and the air was stopped. Here, before the supply of the fiber-forming composition from the second supply port was terminated, the supply rate of the fiber-constituting material (the fiber-forming composition) from the second supply port was reduced to approximately ⅒ of the initial value and the supply of air from the first supply port was reduced to a level whereby a void could not be formed in the length direction of the fiber.

Moreover, the fiber spinning was carried out while supplying the binder solution from the third supply port of the needle nozzle at a quantity whereby the content of the binder in the non-woven fabric layer was 10 mass % relative to the overall mass (100 mass %) of the non-woven fabric layer. Next, a non-woven fabric layer having an average thickness of 10 μm was formed on the negative electrode (the negative electrode active substance layer) by building up fibers, which were obtained by spinning using the electrospinning method mentioned above, on the negative electrode (on the negative electrode active substance layer).

A fiber spun using the materials and processes mentioned above had an opening in one end of the fiber in the length direction, and one non-through hole extending in the length direction of the fiber was formed in each fiber. In addition, the length ($L_W$) from the opening of the non-through hole to the deepest part of the non-through hole in the length direction was approximately 70% of the entire length ($L_F$) of the fiber. In addition, the non-through hole had an approximately circular shape, and the area ($S_W$) of the opening of the non-through hole was approximately 50% of the sum ($S_T$) of the area ($S_F$) of the fiber-constituting part of the fiber when the end of the fiber in which the opening is formed is viewed along the length direction of the fiber and the area ($S_W$) of the opening ($S_T = S_W + S_F$). In addition, the non-through hole was formed so as to include the central axis in the length direction of the fiber, and the size and shape of the non-through hole were almost the same from the opening to the deepest part of the non-through hole. Furthermore, the void volume ($V_W$) of the non-through hole per fiber was approximately 40 vol. % of the sum ($V_T$) of the volume ($V_F$) of the fiber-constituting part of the fiber and the void volume ($V_W$) of the non-through hole ($V_T = V_W + V_F$).

Moreover, the shape of the fibers that constitute the non-woven fabric layer and the average thickness of the non-woven fabric layer were determined by subjecting images taken by a scanning electron microscope (SEM) to image analysis.

A positive electrode was produced according to the following procedure. A slurry-like positive electrode active substance layer-forming composition was prepared by mixing NMP with $LiNi_{0.33}Co_{0.33}Mn_{0.33}O_2$ (LNCM) as a positive electrode active substance powder, AB as an electrically conductive material and PVDF as a binder at a LNCM:AB:PVDF mass ratio of 90:8:2. A positive electrode sheet was prepared by coating this composition in a band-like manner on both surfaces of a long aluminum foil having a thickness of 15 μm (a positive electrode current collector), drying and then pressing. Moreover, the coating weight and pressing conditions of the positive electrode active substance layer-forming composition were adjusted so that the average thickness of the positive electrode was approximately 65 μm (the average thickness of the positive electrode active substance layer on each side was approximately 25 μm).

A separator was produced according to the following procedure. First, a base material sheet having a three layer structure in which a porous polypropylene layer was formed on both surfaces of a porous polyethylene layer was prepared as a separator base material (a base material layer). In addition, a paste-like composition for forming the heat-resistant layer (a heat-resistant layer-forming composition) was prepared by mixing NMP with alumina as an inorganic filler and an acrylic binder as a binder at an inorganic filler:binder mass ratio of 97:3. Next, a separator having a heat-resistant layer (average thickness 5 μm) on one surface of the separator base material was prepared by coating the heat-resistant layer-forming composition on the entire surface of one surface of the separator base material and then drying.

A wound electrode body was produced using one positive electrode, one negative electrode and two separators, which were produced as described above. That is, the negative electrode, which had the non-woven fabric layer formed on a surface of each negative electrode active substance layer, and the positive electrode were overlaid in the longitudinal direction, with the separator disposed therebetween. At this point, the electrode body was overlaid so that the positive electrode and negative electrode active substance layer-non-forming parts were positioned on opposite sides from each other, and the heat-resistant layer of the separator was in a direction facing the negative electrode (the negative electrode active substance layer, that is, the non-woven fabric layer on the negative electrode active substance layer).

Next, the overlaid positive electrode, negative electrode and separators were subjected to a winding tension of approximately 1 N/mm$^2$ per cross sectional area of separator, and wound (wrapped) 130 times in the longitudinal direction (that is, the number of windings was 130). Next, a flat wound electrode body was produced by squeezing this wound body (the wound positive electrode, negative electrode and separators) in a direction that was perpendicular to the winding axis. Moreover, the wound electrode body had a length of 130 mm in the winding axis direction (the longitudinal direction) and had a length of 50 mm in a direction perpendicular to the winding axis direction (the width direction).

Next, lithium ion secondary batteries according to the examples were produced by housing each of the wound electrode bodies according to the examples in a square aluminum battery case (a square battery case), introducing the electrolyte solution from the opening in the battery case, and then hermetically sealing the opening. A non-aqueous electrolyte solution, which was obtained by dissolving 1.1 mol/L of $LiPF_6$ as a supporting electrolyte in a mixed solvent containing EC, EMC and DMC at an EC:EMC:DMC volume ratio of 30:30:40 and which further contained lithium bis(oxalato)borate ($LiB(C_2O_4)_2$) or a difluorophosphate salt ($LiPO_2F_2$) as an additive, was used as the electrolyte solution.

EXAMPLES 2 to 6

Batteries according to Examples 2 to 6 were produced using the same materials and processes as those used in Example 1, except that the average thickness of the non-woven fabric layer was changed to 3 μm to 40 μm (see the thicknesses listed in the "Thickness of non-woven fabric layer" column in Table 1).

EXAMPLES 7 to 11

Batteries according to Examples 7 to 11 were produced using the same materials and processes as those used in Example 1, except that the quantity of the binder contained in the non-woven fabric layer was changed to 2 mass % to 30 mass % of the overall non-woven fabric layer (see the quantities listed in the "Content of binder" column in Table 1) and the average thickness of the non-woven fabric layer was changed to 18 μm.

EXAMPLES 12 to 16

Batteries according to Examples 12 to 16 were produced using the same materials and processes as those used in Example 1, except that the material of the fibers constituting the non-woven fabric layer was changed to the synthetic resins listed in the "Resin component" column in Table 1 (for example, an aramid resin, nylon 66, nylon 12, a polyamideimide or a polysulfone), the quantity of the binder contained in the non-woven fabric layer was changed to 15 mass % of the overall non-woven fabric layer (see the quantity mentioned in the "Content of binder" column in Table 1) and the average thickness of the non-woven fabric layer was changed to 12 μm.

EXAMPLE 17

A battery according to Example 17 was produced using the same materials and processes as those used in Example 1, except that the fibers constituting the non-woven fabric layer were changed to fibers having a solid shape.

Specifically, the battery according to Example 17 was produced using the same materials and processes as those used in Example 1, except that the fiber spinning conditions (the conditions of supply from the first supply port and a second supply port in the needle nozzle (spinning nozzle)) were changed so that the fiber-forming composition was supplied from the first supply port and the fiber-forming composition was not supplied from the second supply port.

EXAMPLE 18

A battery according to Example 18 was produced using the same materials and processes as those used in Example 1, except that the fibers constituting the non-woven fabric were changed to fibers having a hollow shape (a shape in which voids were present inside the fibers but these voids were contained within the fibers).

Specifically, the battery according to Example 18 was produced using the same materials and processes as those used in Example 1, except that the fiber spinning conditions (the conditions of supply from the first supply port and a second supply port in the needle nozzle (spinning nozzle)) were changed so that the supply of air from the first supply port was initiated after the supply of the fiber-forming composition from the second supply port had been initiated (0.1-1 seconds after initiation of the supply of the fiber-forming composition).

EXAMPLE 19

A battery according to Example 19 was produced using the same materials and processes as those used in Example 1, except that the fibers constituting the non-woven fabric layer were changed to fibers, which have through holes that passed right through the fibers in the length direction (in other words, changed to fibers formed like straws).

Specifically, the battery according to Example 19 was produced using the same materials and processes as those used in Example 1, except that the fiber spinning conditions (the conditions of supply from the first supply port and a second supply port in the needle nozzle (spinning nozzle)) were changed so that when the supply of the fiber-forming composition from the second supply port was stopped, the supply of air from the first supply port continued.

[Measurement of Initial Battery Resistance (IV Resistance)]

Next, the initial resistance (IV resistance) of the batteries constructed as described above was measured. First, each battery was subjected to constant current (CC) charging at a temperature of 25° C. until the SOC (State of Charge) was 60%, and then subjected to CC charging for 10 seconds at a rate of 10 C, after which the value (V) of voltage increase was measured. Next, the IV resistance (mΩ) was calculated by dividing the measured increase in voltage (V) by the corresponding current (typically the IV resistance (me) is calculated from the inclination of a primary approximation line on a plot of current (I) against voltage (V)), and the average value was taken to be the initial battery resistance.

Unless otherwise indicated, "SOC" (State of Charge) means the state of charge of a battery based on the voltage range across which the battery is generally used. For example, this means the state of charge based on the rated capacity measured under conditions where the voltage between the terminals (the open circuit voltage (OCV)) is between 4.1 V (the upper limit voltage) and 3.0 V (the lower limit voltage).

[Charging and Discharging Cycle Test]

Next, after measuring the initial resistance of the batteries, the batteries according to the examples were subjected to a charging and discharging cycle test in which 1000 charging and discharging cycles were carried out at a temperature of 25° C., and the rate of increase in resistance (%) following the cycle test was calculated. More specifically, this test was carried out in the following way.

In this charging and discharging cycle test, 1 cycle was deemed to be a cycle of carrying out constant current charging (CC charging) for 240 seconds at a charging rate of 2.5 C at a temperature of 25° C., allowing the battery to rest for 120 seconds, then carrying out constant current discharging (CC discharging) for 20 seconds at a discharging rate of 30 C, and then allowing the battery to rest for 120 seconds. The battery resistance (IV resistance) of each battery following the charging and discharging cycle test was measured using the same method as that used to measure the initial battery resistance. In addition, the rate of increase in resistance (%) was calculated using the following formula: Rate of increase in resistance (%)=(IV resistance following charging and discharging cycle test−initial battery resistance)÷initial battery resistance×100. The results are shown in the corresponding column in Table 1.

TABLE 1

| Example | Resin component | Content of binder (wt. %) | Thickness of non-woven fabric layer (μm) | Rate of resistance increase (%) |
| --- | --- | --- | --- | --- |
| 1 | PVA | 10 | 10 | 30 |
| 2 | PVA | 10 | 3 | 90 |
| 3 | PVA | 10 | 5 | 28 |
| 4 | PVA | 10 | 20 | 25 |
| 5 | PVA | 10 | 30 | 22 |
| 6 | PVA | 10 | 40 | 95 |
| 7 | PVA | 2 | 18 | 88 |
| 8 | PVA | 5 | 18 | 33 |
| 9 | PVA | 12 | 18 | 31 |
| 10 | PVA | 20 | 18 | 30 |
| 11 | PVA | 30 | 18 | 85 |
| 12 | Aramid | 15 | 12 | 15 |
| 13 | Nylon 66 | 15 | 12 | 19 |
| 14 | Nylon 12 | 15 | 12 | 21 |
| 15 | Polyamideimide | 15 | 12 | 23 |
| 16 | Polysulfone | 15 | 12 | 25 |
| 17 | PVA | 10 | 10 | 150 |
| 18 | PVA | 10 | 10 | 140 |
| 19 | PVA | 10 | 10 | 130 |

As shown in Table 1, the batteries according to Examples 1 to 16 showed a smaller increase in resistance following high rate charging and discharging than the batteries according to Examples 17 to 19, which were provided with a non-woven fabric layer constituted from solid fibers, hollow fibers or fibers having a straw-like shape (fibers having through holes). That is, it was confirmed that excellent high rate characteristics can be achieved by using, as constituent fibers of a non-woven fabric, fibers which have one non-through hole in each of the fibers, in which the non-through hole has an opening in one end of the fiber in the length direction thereof, in which the non-through hole extends in the length direction of the fiber, and in which the length ($L_W$) from the opening of the non-through hole to the deepest part of the non-through hole in the length direction is 50% or higher of the entire length ($L_F$) of the fiber.

The batteries according to Examples 1 and 3 to 5 showed a lower increase in resistance following high rate charging and discharging than the batteries according to Examples 2 and 6. The batteries according to Examples 1, 2, 3 to 5 and 6 are batteries having similar constitutions other than the thickness of the non-woven fabric layer. From these results, it was confirmed that the thickness of the non-woven fabric layer is preferably 5 μm to 30 μm.

The batteries according to Examples 8 to 10 showed a lower increase in resistance following high rate charging and discharging than the batteries according to Examples 7 and 11. The batteries according to Examples 7 to 11 are batteries having similar constitutions other than having a different content of the binder in the non-woven fabric layer. From these results, it was confirmed that the content of the binder contained in the non-woven fabric layer is preferably 5 mass % to 20 mass % of the overall non-woven fabric layer.

In addition, the batteries according to Examples 12 to 16 all showed a low increase in resistance following high rate charging and discharging. From these results, it was confirmed that polyamide resins such as aramid resins and nylons (for example, nylon 66 and nylon 12), polyamideimide resins and polysulfone resins can be advantageously used as the fibers constituting the non-woven fabric layer in addition to PVA, which was used to form the non-woven fabric layer in the batteries according to Examples 1 to 11.

Specific examples of the present invention have been explained in detail above, but these are merely embodiments and working examples, and do not limit the scope of the invention. The features disclosed in the claims also encompass modes obtained by variously modifying or altering the specific examples shown above.

What is claimed is:

1. A secondary battery comprising:
   an electrode body having a positive electrode, a negative electrode and a separator that electrically isolates the positive electrode from the negative electrode, and
   an electrolyte solution, wherein
   the secondary battery further comprises a non-woven fabric layer between the separator and the positive electrode and/or between the separator and the negative electrode,
   at least one of the fibers that constitute the non-woven fabric layer have one non-through hole in each of the at least one of the fibers, with the non-through hole having an opening in one end of the fiber in a length direction thereof and extending in the length direction of the fiber, and
   the length ($L_w$) from the opening of the non-through hole to the deepest part of the non-through hole in the length direction is 50% or higher of the entire length ($L_F$) of the fiber.

2. The secondary battery according to claim 1, wherein the area ($S_w$) of the opening of the non-through hole is not less than 30% of the sum ($S_T$) of the area ($S_w$) of the opening and the area ($S_F$) of the fiber-constituting part of the fiber when the end of the fiber, in which the opening is formed, is viewed along the length direction of the fiber ($S_T = S_W + S_F$), and
   the size and shape of the non-through hole are almost the same from the opening to the deepest part of the non-through hole.

3. The secondary battery according to claim 1, wherein the void volume (VW) of the non-through hole per fiber is not less than 20 vol. % of the sum (VT) of the volume (VF) of the fiber-constituting part of the fiber and the void volume (VW) of the non-through hole (VT = VW+VF).

4. The secondary battery according to claim 1, wherein the non-through hole is formed so as to include a central axis in the length direction of the fiber.

5. The secondary battery according to claim 1, wherein the non-woven fabric layer contains a binder that binds together fibers that constitute the non-woven fabric layer, and
   a part of one fiber that constitutes the non-woven fabric layer is bound to a part of another fiber by the binder.

6. The secondary battery according to claim 5, wherein the content of the binder contained in the non-woven fabric layer is 5 mass % to 20 mass % of the overall non-woven fabric layer.

* * * * *